United States Patent
Koyama et al.

(10) Patent No.: US 6,237,106 B1
(45) Date of Patent: May 22, 2001

(54) COMMUNICATION APPARATUS AND METHOD, AND PROGRAM IN COMPUTER READABLE MEDIUM

(75) Inventors: Shinichi Koyama, Tokyo; Takashi Kobayashi, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/186,485

(22) Filed: Nov. 5, 1998

(30) Foreign Application Priority Data

Nov. 6, 1997 (JP) .................................................. 9-304230
Feb. 18, 1998 (JP) ................................................ 10-035932

(51) Int. Cl.$^7$ ...................................................... G06F 1/26
(52) U.S. Cl. ........................................... 713/502; 713/320
(58) Field of Search .............................. 713/30, 600, 323, 713/300, 322, 320, 502, 601

(56) References Cited

U.S. PATENT DOCUMENTS

| | | | |
|---|---|---|---|
| 5,485,603 | * | 1/1996 | Nijholt .................................. 713/400 |
| 5,774,701 | * | 6/1998 | Matsui et al. ......................... 713/501 |
| 5,815,693 | * | 9/1998 | McDermott et al. ................. 713/501 |
| 5,903,746 | * | 5/1999 | Swoboda et al. .................... 713/501 |
| 5,918,058 | * | 6/1999 | Budd .................................... 713/300 |
| 5,933,649 | * | 8/1999 | Lim et al. ............................. 713/300 |

* cited by examiner

Primary Examiner—Thomas Lee
Assistant Examiner—Nitin Patel
(74) Attorney, Agent, or Firm—Fitzpatrick, Cella, Harper & Scinto

(57) ABSTRACT

In a communication apparatus having a first mode capable of communicating with an external apparatus and a second mode having a consumption power smaller than the second mode, the communication apparatus controls to alternately switch between the first and second modes at an interval of a predetermined period. In this case, the communication apparatus variable controls the periods of the first and second modes in accordance with the type of a power source or a remaining capacity of an internal power source, the power sources driving the communication apparatus.

24 Claims, 11 Drawing Sheets

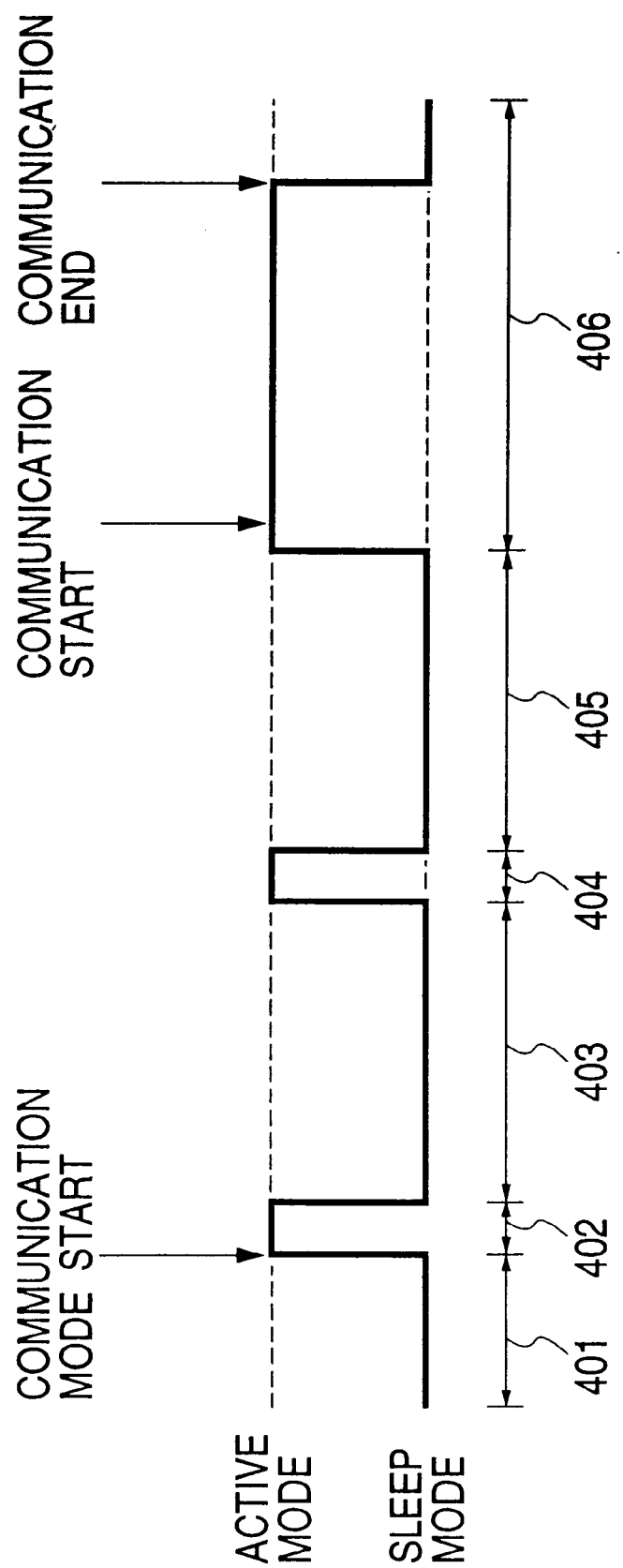

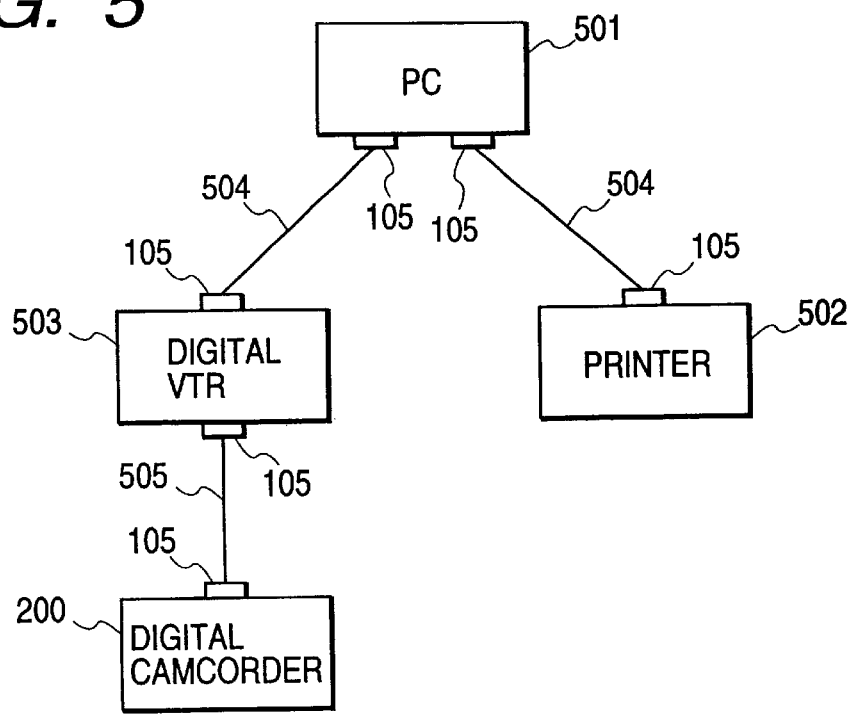
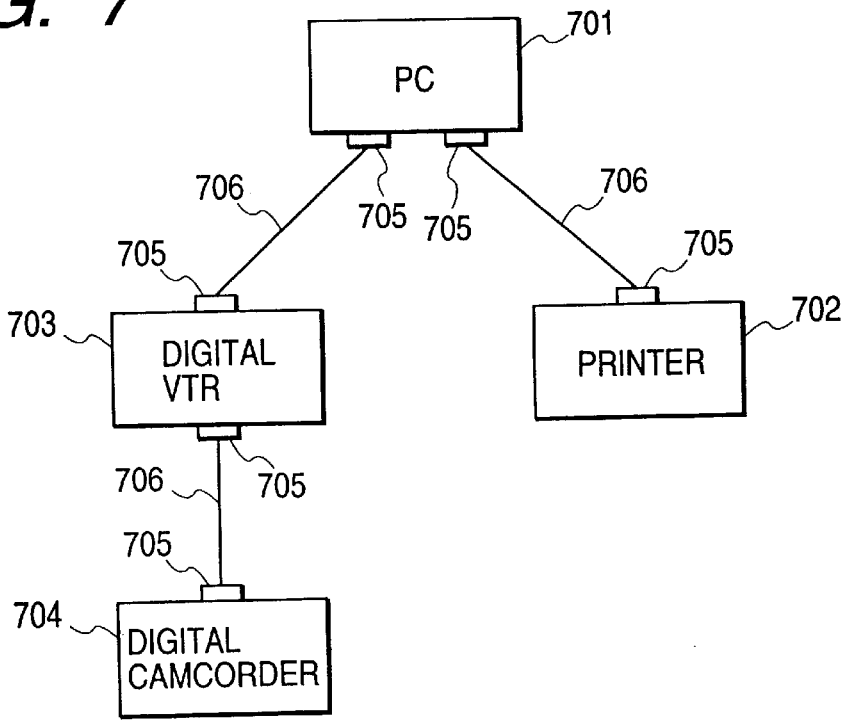

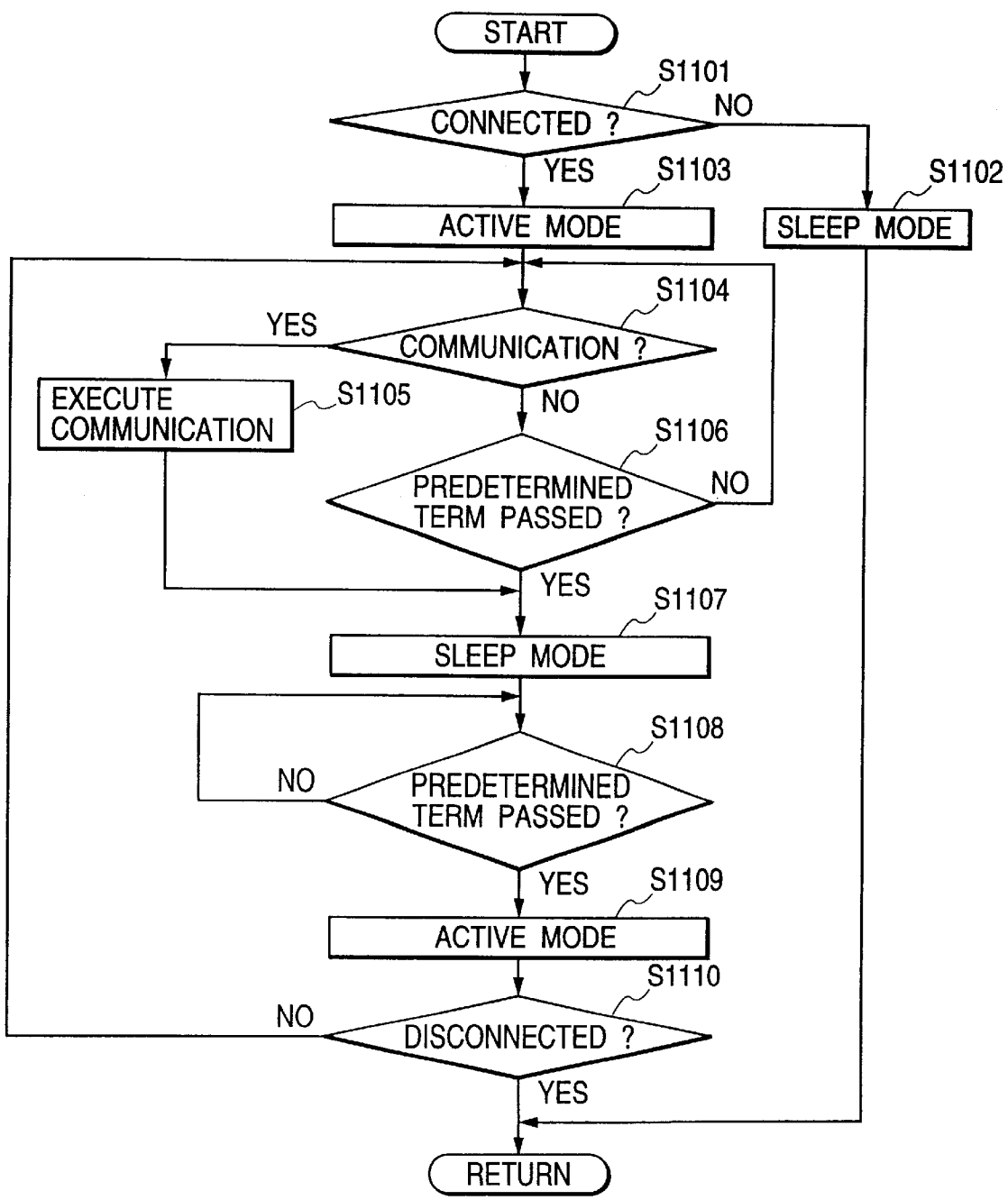

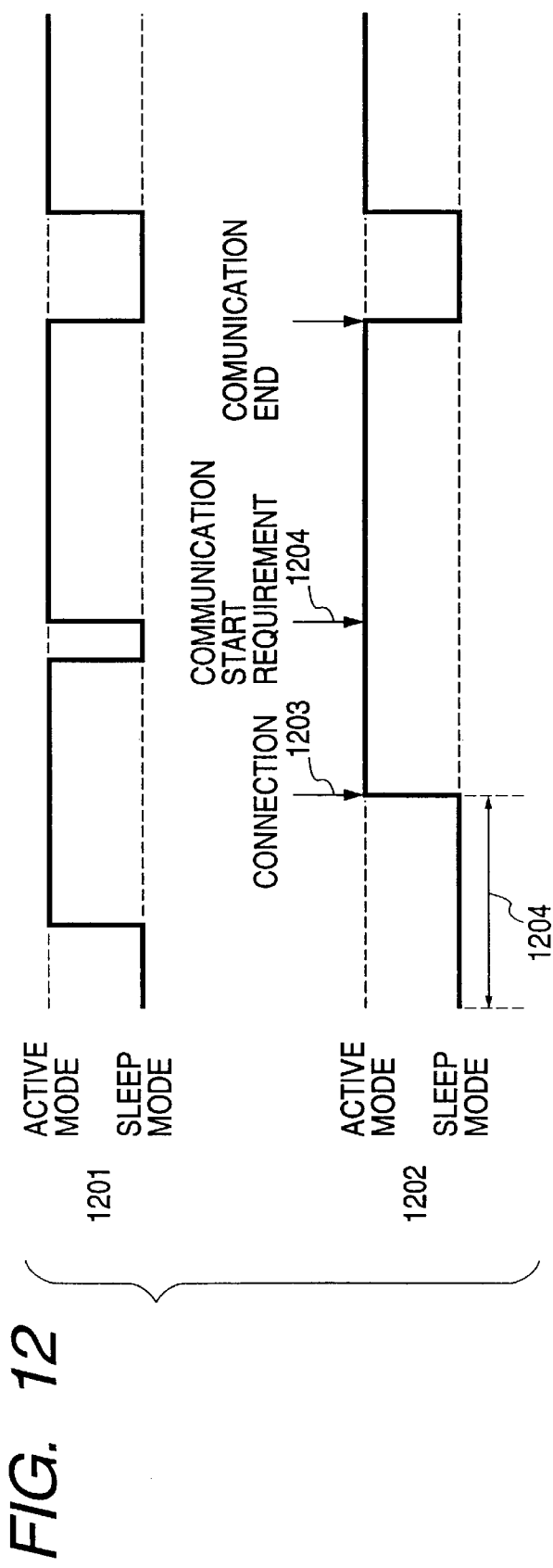
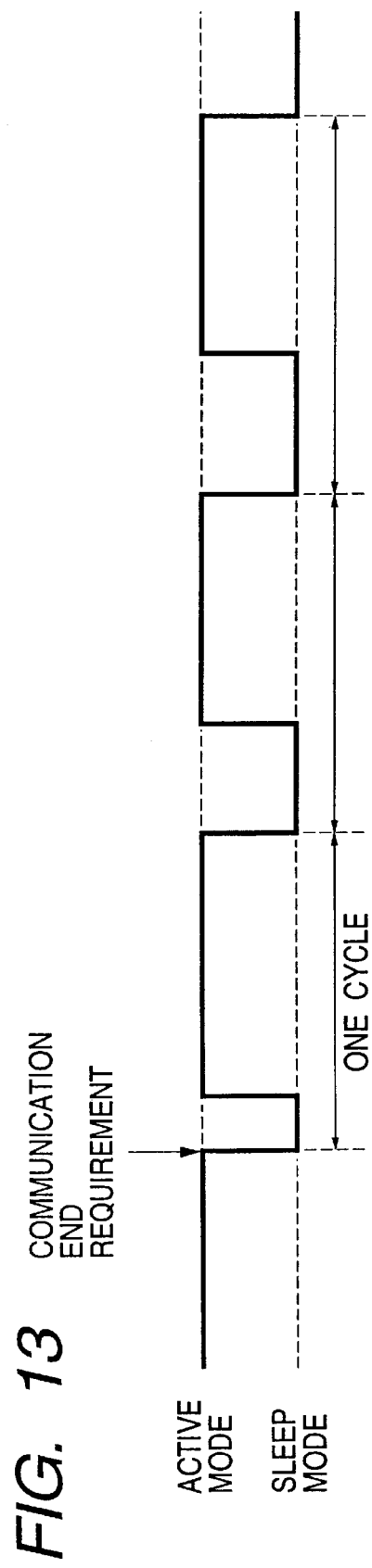

COMMUNICATION APPARATUS AND METHOD, AND PROGRAM IN COMPUTER READABLE MEDIUM

BACKGROUND OF THE INVENTION

1. Field of the Invention

The present invention relates to a communication apparatus and method, and a program in a computer readable medium, and more particularly to technologies of reducing a consumption power of each electronic apparatus for digital data communication or a whole system of electronic apparatuses.

2. Related Background Art

Technologies of configuring one communication system are being developed nowadays. This communication system connects AV apparatuses (e.g., digital cameras, digital video cameras) which process digitalized image signals and audio signals, to personal computers (hereinafter abbreviated as PC) and their peripheral apparatuses (e.g., printers, hard disk drives, CD-ROM drives), by using common communication interfaces, to thereby configure one communication system.

One example of communication interfaces used with such a communication system is IEEE 1394-1995 high performance serial bus standards (hereinafter called IEEE 1394 standards). A communication interface in conformity with IEEE 1394 standards (hereinafter called a 1394 interface) is a digital interface capable of transferring data at higher speed than conventional technologies and supporting a real time transfer of image and audio signals. The 1394 interface has several characteristics as in the following.

(1) The 1394 interface has two transfer modes, an isochronous transfer mode and an asynchronous transfer mode. The isochronous transfer mode ensures transmission/reception of data of a certain amount during each communication period (125 $\mu$s), and is effective for real time transfer of image and audio signals. The asynchronous transfer mode transmits/receives data asynchronously with a communication cycle, and is effective for transmission/reception, when necessary, of control commands, file data, and the like. In each one communication cycle period, the asynchronous transfer mode has a lower priority over the isochronous transfer mode.

(2) The 1394 interface provides a connection configuration with a high degree of freedom. Specifically, a mixture of a daisy chain connection and a node branch connection is possible, allowing a configuration of a network with a high degree of freedom.

(3) The 1394 interface can automatically recognize the connection configuration of a network. Namely, when a new apparatus is added or removed or a power is turned on or off, the new network connection configuration is automatically recognized and IDs assigned to respective apparatuses are automatically set again.

(4) Since data transfer is serially executed between apparatuses, a thin communication cable can be used and a smaller connector can be used. The communication cable has a power feed pair cable so that power can be supplied to a 1394 interface of an apparatus whose main power was turned off. Therefore, even if the main power of an apparatus is turned off, communication over the network cannot be shut down.

The 1394 interface is, however, associated with the following problem.

In order for an apparatus equipped with a 1394 interface to achieve the above-described characteristic features, it is necessary to always feed a power to the whole circuitry of its own 1394 interface. Therefore, even during the period while an apparatus connected to the network is not necessary to communicate with another apparatus, it is required to always feed a power to its own 1394 interface wastefully. This problem becomes conspicuous when a portable apparatus (e.g., digital cameras, camera mounted digital video recorders) driven with an internal power source such as a battery is used. The 1394 interface of this portable apparatus consumes its internal power source more quickly.

SUMMARY OF THE INVENTION

An object of the present invention is to solve the above-described problem.

Another object of the invention is to reduce a power consumption of a communication apparatus and to establish a communication path to another communication apparatus at any time when necessary.

As a preferred embodiment for such objects, a communication apparatus of this invention is disclosed which comprises: communication means having a first mode capable of communicating with an external apparatus and a second mode having a consumption power smaller than the second mode; control means for alternately switching between the first and second modes after the communication apparatus is connected to the external apparatus; and detecting means for detecting the external apparatus as a communication destination during a period of the first mode.

As another embodiment, a communication apparatus of this invention is disclosed which comprises: communication means having a first mode capable of communicating with an external apparatus and a second mode not communicating with the external apparatus; and control means for controlling the communication means so as to alternately switch between the first and second modes, wherein a period of the first mode is longer than a period of the second mode.

As another embodiment, a communication apparatus of this invention is disclosed which comprises: communication means having a first mode capable of communicating with an external apparatus and a second mode not communicating with the external apparatus; and control means for controlling to make a period of the first mode longer than a period of the second mode and to make the period of the first mode overlap the period of the first mode of at least one of external apparatuses.

Another object of the invention is to provide a communication method capable of reducing a power consumption of a communication apparatus and establishing a communication path to another communication apparatus when necessary.

As a preferred embodiment for such an object, a communication method of this invention is disclosed which comprises the steps of: communicating with an external apparatus; controlling to alternately switch between a first mode capable of communicating with the external apparatus and a second mode having a consumption power smaller than the second mode, after a connection to the external apparatus is established; and detecting the external apparatus as a communication destination during a period of the first mode.

As another embodiment, a communication method of this invention is disclosed which comprises the steps of: communicating with an external apparatus; and controlling to alternately switch between a first mode capable of communicating with the external apparatus and a second mode not communicating with the external apparatus, a period of the first mode being longer than a period of the second mode.

As another embodiment, a communication method of this invention is disclosed which comprises the steps of: communicating with an external apparatus; and controlling to make a period of a first mode capable of communicating with the external apparatus longer than a period of a second mode not communicating with the external apparatus and to make the period of the first mode overlap the period of the first mode of at least one of external apparatuses.

Another object of the invention is to provide a program written in a computer readable medium capable of reducing a power consumption of a communication apparatus and establishing a communication path to another communication apparatus when necessary.

As a preferred embodiment for such an object, a program written in a computer readable medium of this invention is disclosed which comprises the steps of: instructing to communicate with an external apparatus; controlling a communication apparatus to alternately switch between a first mode capable of communicating with the external apparatus and a second mode having a consumption power smaller than the second mode, after a connection to the external apparatus is established; and instructing to detect the external apparatus as a communication destination during a period of the first mode.

As an embodiment, a program written in a computer readable medium of this invention is disclosed which comprises the steps of: instructing to communicate with an external apparatus; and controlling to alternately switch between a first mode capable of communicating with the external apparatus and a second mode not communicating with the external apparatus, a period of the first mode being longer than a period of the second mode.

As an embodiment, a program written in a computer readable medium of this invention is disclosed which comprises the steps of: instructing to communicate with an external apparatus; and controlling to make a period of a first mode capable of communicating with the external apparatus longer than a period of a second mode not communicating with the external apparatus and to make the period of the first mode overlap the period of the first mode of at least one of external apparatuses.

Still other objects of the present invention, and the advantages thereof, will become fully apparent from the following detailed description of the embodiments.

BRIEF DESCRIPTION OF THE DRAWINGS

FIG. 4 is a diagram illustrating an operation state change of an interface 210 shown in FIG. 2.

FIG. 5 is a diagram showing an example of a communication system with a digital interface having the function similar to that of the interface 210 shown in FIG. 2.

FIG. 7 is a block diagram showing the structure of a communication system according to a second embodiment.

FIG. 11 is a flow chart illustrating an operation of a digital interface 801 shown in FIG. 10.

FIG. 12 is a diagram illustrating an operation state change of the digital interface 801 of each communication apparatus according to the second embodiment.

FIG. 13 is a diagram illustrating an example of an operation state change of the digital interface 801 according to the second embodiment.

DETAILED DESCRIPTION OF THE PREFERRED EMBODIMENTS

The preferred embodiments of the present invention will now be described in detail hereinafter with reference to the accompanying drawings.

First Embodiment

Figure 1:
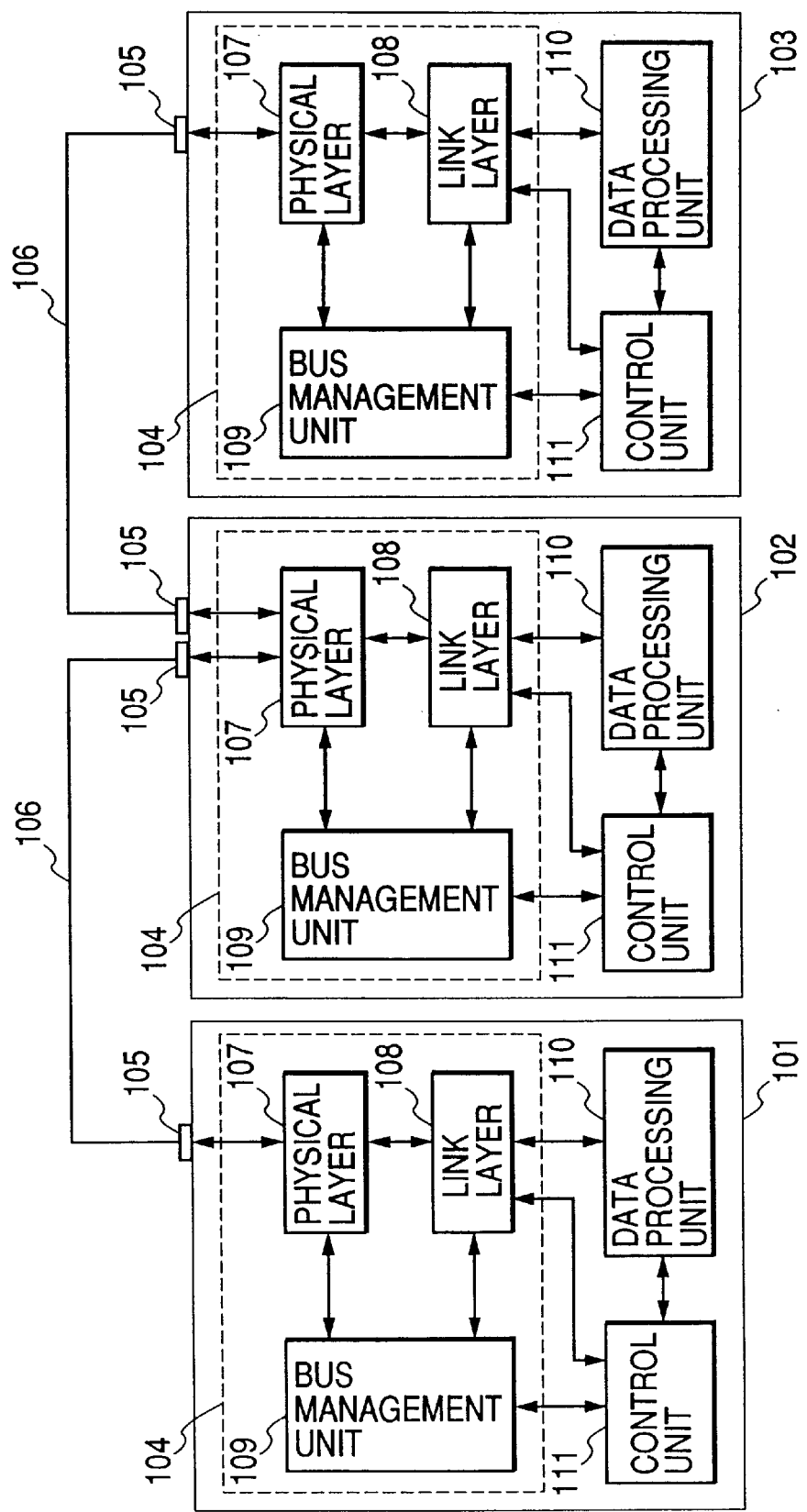
FIG. 1 is a block diagram showing the fundamental structure of a communication apparatus according to a first embodiment.

FIG. 1 is a block diagram showing the fundamental structure of a communication apparatus according to the first embodiment. A communication digital interface equipped with each communication apparatus is in conformity with IEEE 1394 standards and has the functions to be described later. The fundamental structure and function of the digital interface of each apparatus will be described.

Referring to FIG. 1, each communication apparatus 101 to 103 is connected to another communication apparatus via a serial bus cable 106 and a communication port 105. The cable 106 is made of two pairs of twist pair cables. One pair is used for data signal transfer, and the other pair is used for strobe signal transfer. As the cable 106, there are two types of cables, a six-pin terminal cable constituted of two pairs of twist pair cables and a power feed pair cable and a four-pin terminal cable constituted of two pairs of twist pair cables without the power feed cable.

A digital interface 104 includes at least a physical layer 107, a link layer 108, and a bus management unit 109 in order to allow communication with another communication apparatus. The physical layer 107 is provided with functions such as bus initialization (bus reset), encode/decode of transmission/reception packet, and arbitration of bus use privilege. The link layer 108 is provided with functions such as generation/detection of transmission packet, generation/detection of error correction code, and control of communication cycle. The bus management unit 109 is provided with functions such as control of the physical layer and link layer, management of isochronous transfer mode, and control of communication with application.

A data management unit 110 has a storage medium and performs processes such as a compression encoding process, an expansion decoding process, a print process, a display process, a record process, and a reproduction process, relative to data capable of being processed by the communication apparatuses 101 to 103, e.g., digital image data and digital audio data. A control unit 111 has a microcomputer and controls to switch between the functions of the digital interface 104 of each communication apparatus 101 to 103 and to switch between operation modes of a data processing unit 110 and the like. The control unit 111 controls transmission/reception of data processed by the data processing unit 110, in accordance with various communication protocols (e.g., AV protocol).

As a specific example of the communication apparatus shown in FIG. 1, the detailed structure of a camera mounted digital video recorder (hereinafter called a digital camcorder) equipped with the above-described digital interface will be described with reference to FIG. 2.

Figure 2:
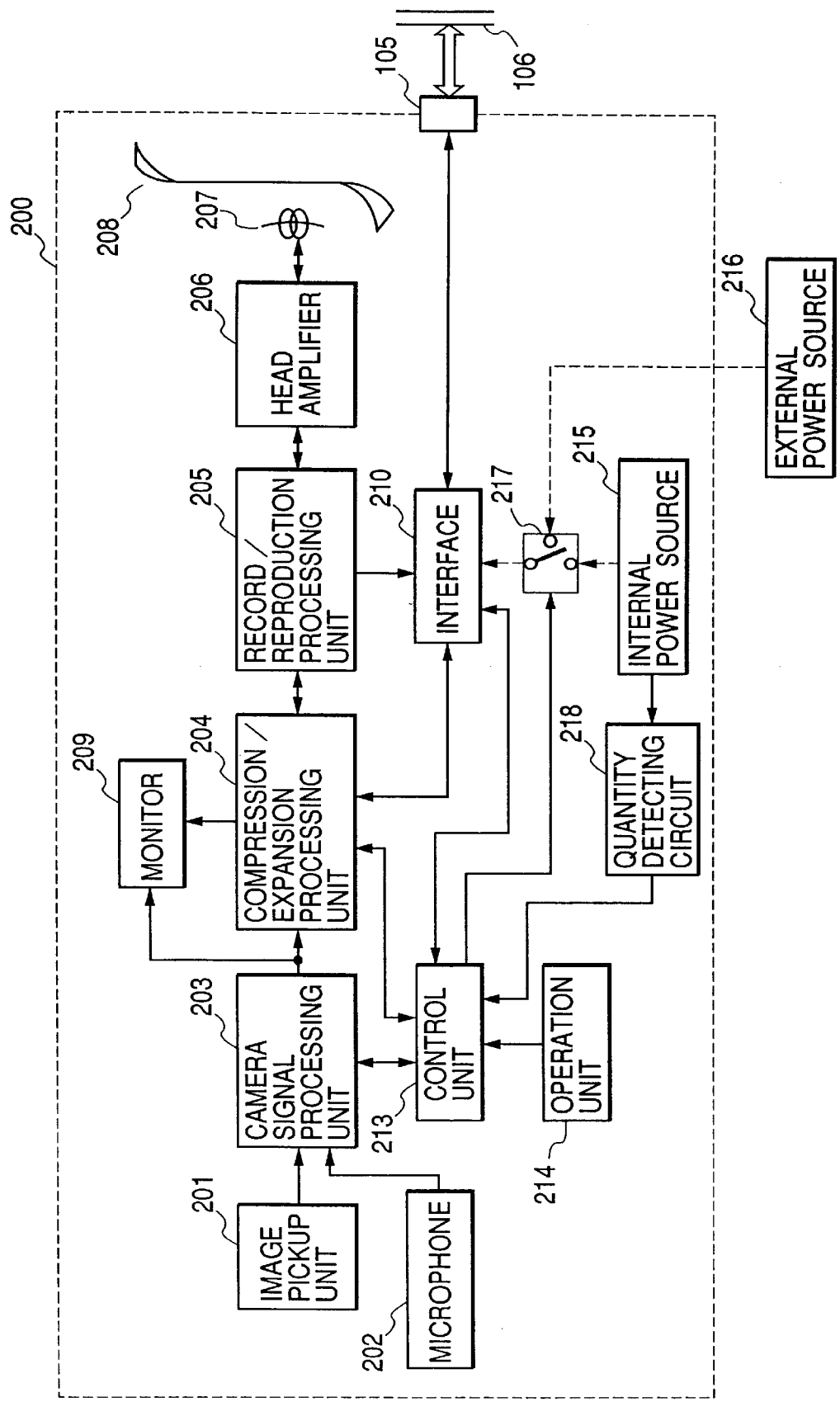
FIG. 2 is a block diagram showing the detailed structure of a digital camcorder 200 which is one example of the communication apparatus shown in FIG. 1.

Referring to FIG. 2, reference numeral 201 represents an image pickup unit having an optical lens and image pickup elements such as CCD and generating an image pickup signal from an optical image of a subject taken with the optical lens and image pickup elements. Reference numeral 202 represents a microphone for collecting external sounds and generating audio signals. Reference numeral 203 represents a camera signal processing unit for digitalizing the image pickup signal generated by the image pickup unit 201 and converting it into a digital image signal of the standard television format (NTSC, PAL, or the like). The camera signal processing unit 203 also digitizes the audio signal generated by the microphone 202 and converts it into a digital audio signal of a predetermined format.

Reference numeral 204 represents a compression/expansion processing unit capable of performing a high efficiency compression encoding process of a predetermined scheme (e.g., quantization after discrete cosine transform for variable length encoding) relative to the digital image and audio signals generated by the camera signal processing unit 203 and performing a corresponding expansion decoding process. Reference numeral 205 represent a record/reproduction processing unit for converting the digital image and audio signals compression-encoded by the compression/expansion processing unit 204 into signals having a format suitable for a record/reproduction process and recording/reproducing the signals as the record data in/from a recording medium. In the first embodiment, the record data generated by the record/reproduction processing unit 205 is recorded/reproduced to/from a recording medium such as a magnetic tape 208 via a head amplifier 206 and a magnetic head 207.

Reference numeral 209 represents a monitor for displaying the digital image signal and outputting the digital audio signal, respectively generated by the camera signal processing unit 203 or reproduced by the record/reproduction processing unit 204. Reference numeral 210 represents the above-described interface. This interface 210 converts the digital image and audio signals supplied from the compression/expansion processing unit 204 or record/reproduction processing unit 205 and a control signal supplied from a control unit 213 into a packet in accordance with a predetermined communication protocol (e.g., AV protocol), and transfers each packet to another communication apparatus via the communication port 105 and serial bus 106. The interface 210 packetizes the digital image and audio signals in a packet type for the isochronous transfer mode and outputs the packet during each communication cycle. The interface 210 also packetizes the control signal in a packet type for the asynchronous transfer mode and outputs the packet asynchronously.

Reference numeral 213 represents the control unit made of a microcomputer capable of controlling the operation of each component of the digital camcorder 200. Reference numeral 214 represents an operation unit capable of performing various operations (e.g., start, end, an temporary stop of moving image pickup, still image pickup, record, reproduction, external communication, dubbing, and the like) by using a touch panel, a switch, a button or the like.

The communication apparatus of the first embodiment is not limited only to the camera mounted digital VTR 200, but may be other electronic apparatuses having similar functions to the above-described interface 210, such as a personal computer, a printer, a scanner, a digital camera, and a hard disk drive.

Reference numeral 215 represents an internal power source such as a battery for supplying a drive power to the digital camcorder 200. Reference numeral 216 represents an external power source for externally supplying a drive power via an AC plug or the like. Reference numeral 217 represents a switch for selecting one of the internal power source 215 and external power source 216 and supplying a power necessary for the digital camcorder 200. Reference numeral 218 represents a quantity detecting circuit for detecting the remaining capacity of the internal power source 215.

The operation of the digital camcorder 200 of the first embodiment will be described with reference to FIG. 2.

The digital camcorder 200 of the first embodiment has a recording mode, a reproducing mode, and a communication mode. In the recording mode, the image signal picked up with the image pickup unit 201 and the audio signal generated by the microphone 202 are recorded in the magnetic tape 208. In the reproducing mode, image and audio signals recorded in the magnetic tape 208 are reproduced to display and output them on/from the monitor 209. In the communication mode, the image and audio signals generated by the image pickup unit 201 and microphone 202 and the image and audio signals reproduced from the magnetic tape 208 are transferred to an external apparatus via the interface 210. Each operation mode is set by the operation unit 214 and controlled by the control unit 213.

The recording and reproducing modes are made executable when the interface 210 of the digital camcorder 200 is not connected to another apparatus. The communication mode is made executable when the interface 210 of the digital camcorder 200 is connected to another apparatus.

First, the recording mode will be described. The image signal picked up with the image pickup unit 201 and audio signal generated by the microphone 202 are converted by the camera signal processing unit 203 into digital image and audio signals of a predetermined format and supplied to the compression/expansion processing unit 204. The compression/expansion processing unit 204 performs a compression encoding process by using discrete cosine transform or the like relative to the digital image and audio signals, and supplies them to the record/reproduction processing unit 205. The record/reproduction processing unit 205 converts the compression encoded data into a format (e.g., household electric commodities digital video format) suitable for the record/reproduction process, and records/reproduces it as record data in/from the magnetic tape 208. In the first embodiment, although the magnetic tape 208 is used as the recording medium for recording the record data, it is not limited thereto, but other media such as a magnetic disk may also be used.

Next, the reproducing-mode will be described. The record data recorded in the magnetic tape 208 is read with the magnetic head 207 and input to the record/reproduction processing unit 205 via the head amplifier 206. The record/reproduction processing unit 205 inverse-converts the record data read from the magnetic tape 208 and supplies it to the compression/expansion processing unit 204. The compression/expansion processing unit 204 performs an expansion decoding process relative to the compression encoded data to convert it into a standard television signal and thereafter supply it to the monitor 209. The monitor 209 displays the image signal reproduced from the magnetic tape 208 and outputs the audio signal.

The communication mode will be described. The digital camcorder 200 of the first embodiment can perform a dubbing operation of digital image and audio signals with an external apparatus during the communication mode.

In the communication mode, the interface 210 packetizes the image and audio signals supplied from the compression/expansion processing unit 204 or record/reproduction processing unit 205 to form a packet for the isochronous transfer mode, in accordance with a predetermined communication protocol (e.g., AV protocol). Each generated packet is transferred to the data bus 106 during each communication cycle. The control signal supplied from the control unit 213 to the interface 210 is packetized to form a packet for the asynchronous transfer mode and transfer it asynchronously.

Also in the communication mode, it is possible to receive the digital image and audio signals transmitted from another communication apparatus through isochronous transfer and to record them in the magnetic tape 208 or display them on the monitor 209. It is also possible to receive a control signal or the like transmitted from another communication apparatus through asynchronous transfer to control the operations of the image pickup unit 201, record/reproduction processing unit 205, and the like of the digital camcorder 200 in accordance with the received control signal.

Next, the functions of the interface 210 equipped to the communication apparatus of the first embodiment will be described in detail.

The interface 210 of the first embodiment is provided with two functions, an active mode and a sleep mode.

In the active mode, a sufficient power is supplied to each component of the interface 210 and the interface 210 can communicate with another apparatus at any time. In the active mode, the interface 210 can output a bias voltage to the data bus 106 and can detect the bias voltage output by another apparatus on the network. Therefore, in the active mode, the interface can automatically detect connection and disconnection of another apparatus in a manner in conformity with IEEE 1394 standards.

In the sleep mode, no power is supplied to each component of the interface 210 and the interface 210 cannot communicate with another apparatus. In the sleep mode, therefore, the interface 210 can neither output a bias voltage to the data bus 106 nor detect a bias voltage on the data bus 106. In the sleep mode, therefore, another apparatus judges that the digital camcorder 200 was disconnected from the network or did not exist. The active mode and sleep mode are switched by the control unit 213.

Figure 3:
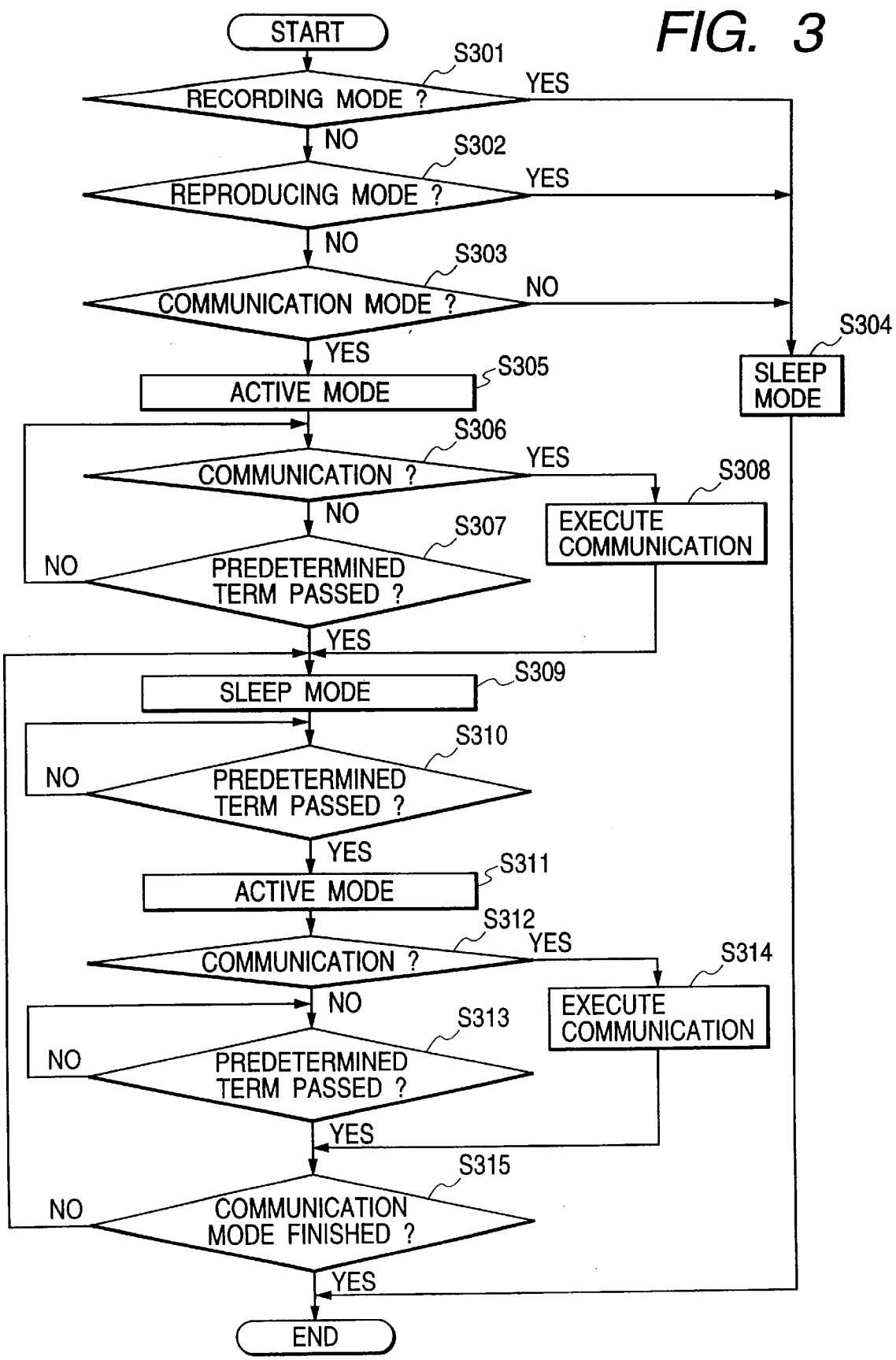
FIG. 3 is a flow chart illustrating a control operation to be executed by a control unit 213 shown in FIG. 2.

Next, the control operation to be executed by the control unit 213 will be described with reference to the flow chart of FIG. 3 illustrating the operation of the control unit 213 and with reference to FIG. 4 illustrating the operation state change of the interface 210.

First, the control unit 213 detects an operation mode of the digital camcorder 200 (Steps S301 to S303). If the detected operation mode is either the recording mode or reproducing mode, the control unit 213 shuts down the power supplied to the interface 210 to always maintain the sleep mode and not to communicate with an external apparatus (Step S304). This period corresponds to a period 401 shown in FIG. 4.

If the detected operation mode at Step S303 is the communication mode, the control unit 213 supplies a power to the interface 210 to set the active mode (Step S305).

During the active mode, the control unit 213 checks whether or not communication with another apparatus on the network is necessary (Step S306), and continues this check during a predetermined period (Step S307). After the lapse of the predetermined period (periods 402 and 404 shown in FIG. 4), the control unit 213 makes the interface 210 to enter the sleep mode (Step S309). At this time, if it is recognized that communication with another apparatus is necessary and that the communication partner apparatus exists on the network, the interface 210 performs the communication during the period while the active mode is maintained, and after the communication, the mode is switched to the sleep mode (Step S308).

The interface 210 switched to the sleep mode maintains the sleep mode for a predetermined period (periods 403 and 405 in FIG. 4) (Step S310), and thereafter the mode is switched again to the active mode (Step S311). The period while the sleep mode continues (periods 403 and 405 in FIG. 4) is longer than the period while the active mode continues (periods 402 and 404 in FIG. 4).

During the next active mode (period 404 in FIG. 4), the control unit 213 checks whether or not communication with another apparatus on the network is necessary (Step S312), and continues this check during a predetermined period (Step S313). After the lapse of the predetermined period, the control unit 213 checks whether or not the communication mode is terminated. If not, the operations from Step S309 are repeated, whereas if terminated, the processes are completed (Step S315).

For example, during the communication mode, if it is recognized that communication with another apparatus is necessary and that the communication partner apparatus exists on the network, the interface 210 performs the communication during the active mode which is maintained during the period (period 406 in FIG. 4) until the communication is terminated. After the communication, the control unit 213 checks whether or not the communication mode is terminated. If not, the operations from Step S309 are repeated, whereas if terminated, the processes are completed.

As above, the control unit 213 always sets the sleep mode if the operation mode of the digital camcorder 200 is the recording or reproducing mode. If the operation mode is the communication mode, the operation state of the interface 210 is periodically switched between the sleep mode and active mode, and during this active mode the control unit 213 controls to detect a communication apparatus as a communication path. With such a control, the power consumption of the digital camcorder can be reduced, and a communication path can be ensured when necessary.

If a request for a communication start is issued during the sleep mode, the control unit 213 controls to detect a communication partner during the next active mode. However, immediately after the request, the sleep mode may be switched to the active mode to detect the communication partner.

The control unit 213 of the first embodiment can also control the periods of the sleep mode and active mode in accordance with a type of a power source of the digital camcorder 200. For example, if the power source for driving the digital camcorder 200 is the external power source 216, the periods during the active mode may be made longer than the periods 402 and 404 shown in FIG. 4. If the power source for driving the digital camcorder 200 is the internal power source 215, the periods during the active mode may be made shorter than the periods 402 and 404 shown in FIG. 4. If the internal power source 215 is used, it is also possible to variably control the period during the active mode in accordance with the detection result of the quantity detecting circuit 218. For example, as the capacity of the internal power source lowers, the period of the active mode may be made shorter and the period during the sleep mode may be made longer to thereby further reduce a power consumption.

FIG. 5 is a diagram showing an example of a communication system with a digital interface having the function similar to that of the interface d210 shown in FIG. 2.

Referring to FIG. 5, reference numeral 501 represents a personal computer (hereinafter called a PC), reference numeral 502 represents a printer for printing image data or text data transferred from another communication apparatus, reference numeral 503 represents a mount type digital VTR (hereinafter called a digital VTR), and reference numeral 200 represents a digital camcorder shown in FIG. 2.

In the communication system of the first embodiment, an interface of each communication apparatus has one or more communication ports 105. Each communication port is connected to a cable 504, 505.

In the first embodiment, the cables 504 between PC 501 and the printer 502 and between PC 501 and the digital VTR 503 include a power supply pair cable (i.e., six-pin terminal cable). The cable 505 between the printer 502 and the digital camcorder 200 does not include the power supply pair cable (i.g., four-pin terminal cable). Also in the first embodiment, the digital interface of each communication apparatus shown in FIG. 5 has the above-described active mode and sleep mode. The digital interface has a function of alternately switching between the active and sleep modes during the communication mode.

Next, with reference to FIG. 6, the operation state of the interface of each communication apparatus of the first embodiment will be described. In the first embodiment, similar to the digital camcorder 200, the digital interface of the digital VTR has three operation modes (recording mode, reproducing mode, and communication mode). In the example shown in FIG. 5, the power sources of PC 501 and the printer 502 are off, and the power sources of the digital VTR and digital camcorder 200 are on.

Figure 6:
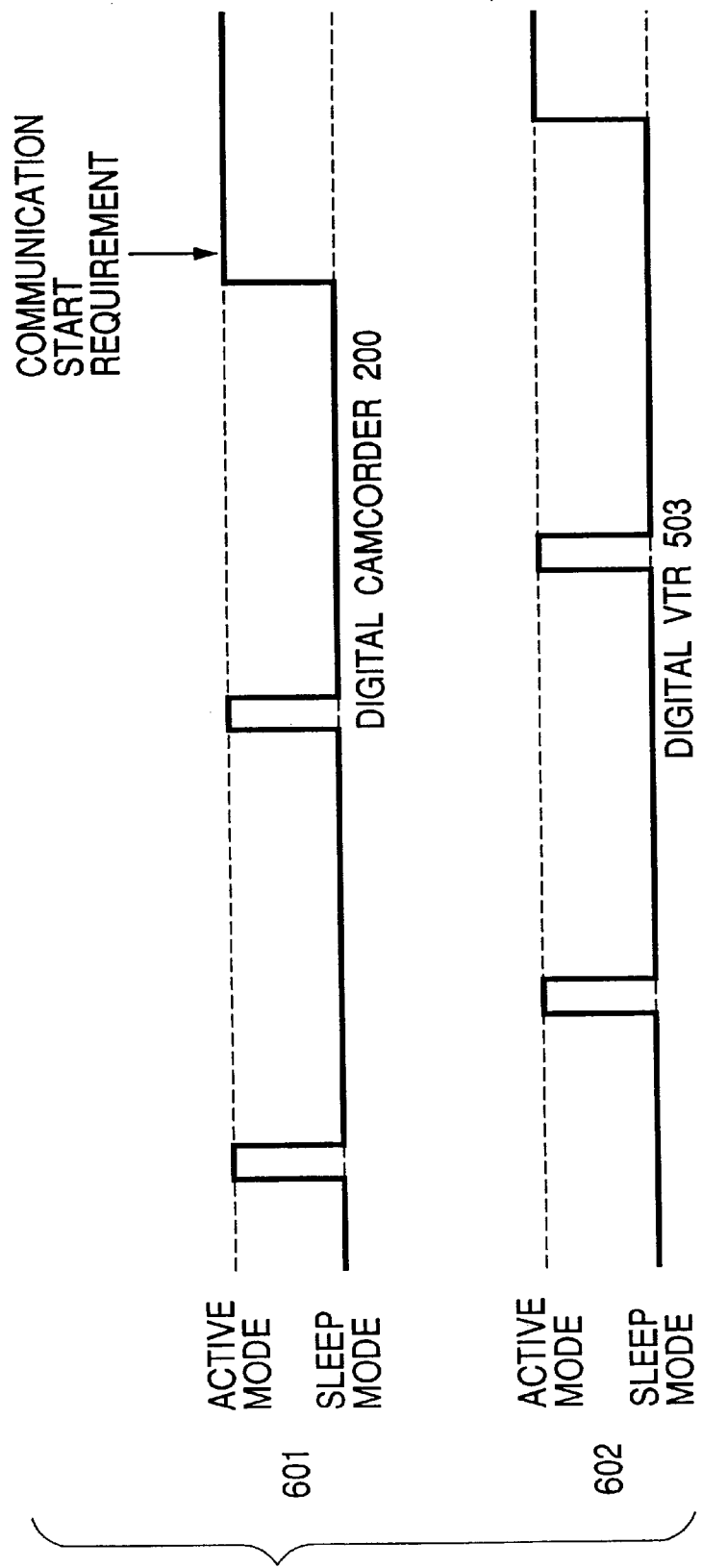
FIG. 6 is a diagram illustrating an operation state change of a digital interface of each communication apparatus according to the first embodiment.

Referring to FIG. 6, reference numeral 601 indicates an operation state of the interface of the digital VTR 503, and reference numeral 602 indicates an operation state of the interface 210 of the digital camcorder 200. The digital VTR 503 and digital camcorder 200 are both in the communication mode.

During the period while the interfaces of the digital VTR 503 and digital camcorder 200 are both in the sleep mode, it is not possible to detect a communication partner. Therefore, the interface of each apparatus is controlled to be periodically switched to the active mode.

If the interface of one apparatus is in the sleep mode while the other is in the active mode, the interface in the active mode cannot detect a communication partner and after a predetermined period of the active mode, the mode is switched to the sleep mode. If the interface of one apparatus is switched to the active mode while the other is in the active mode, the interface in the active mode continues the active mode longer than the ordinary period in order to detect the communication partner. If the communication partner is detected during this period, the interface of each apparatus continues the active mode at least during the period until the communication is terminated.

For example, if a communication start is instructed by the digital camcorder 200, its interface 210 continues the active mode during a period longer than the ordinary period to detect a communication partner. If during this period the operation state of the interface of the digital VTR 503 changes from the sleep mode to the active mode, the interface 210 of the digital camcorder 200 checks whether the digital VTR 503 is a communication partner. If it is detected that the digital VTR 503 is a communication partner, the interface of each apparatus continues the active mode at least during the period until the communication is terminated. If it is detected that the digital VTR 503 is not a communication partner, the interface 210 of the digital camcorder 200 continues the active mode during a period longer than the ordinary period and thereafter the mode is switched to the sleep mode.

As above, in the digital interface of each communication apparatus of the first embodiment, the power consumption is reduced by alternately switching between the sleep mode of a predetermined period and the active mode of a predetermined period. In this case, the lengths of the periods of the active mode and sleep mode may be exchanged cyclically. Specifically, the lengths of the periods of the active mode and sleep mode may be exchanged in accordance with the type of the power source (internal or external power source) for supplying a power to the digital interface or the remaining capacity of the internal power source.

As above, the digital interface of each apparatus is provided with the active mode for a normal operation and the sleep mode for power consumption reduction, and these modes are switched properly to achieve highly efficient power consumption reduction and establish a communication path.

In the first embodiment, a digital interface in conformity with IEEE 1394 standards is used as the digital interface of each communication apparatus such as the digital camcorder 200. The interface is not limited only thereto. For example, other interfaces may also be used if they can automatically detect a change in the network configuration such as addition and removal of an electronic apparatus and can automatically set and recognize the ID of each electronic apparatus on the network.

The embodiment may be configured by supplying the control unit (including a microcomputer) of the embodiment system or apparatus with a storage medium storing software program codes realizing the embodiment functions. In this case, the control unit of the embodiment system or apparatus reads the program codes stored in the storage medium and makes various circuits of the system or apparatus realize the embodiment functions.

The program code themselves read from the storage medium realize the embodiment functions, and the storage medium storing the program codes constitutes the invention.

The storage medium storing such program codes may be a floppy disk, a hard disk, an optical disk, a photomagnetic disk, a CD-ROM, a CD-R, a magnetic tape, a non-volatile memory card, and a ROM.

Obviously, the case wherein the embodiment functions are realized by controlling the operations of various processing circuits of the embodiment system or apparatus by an OS (operating system) running on the control unit or another application in accordance with the program codes read by the control unit from the storage medium, also constitutes the invention.

Furthermore, the scope of the invention also includes obviously the case wherein in accordance with the program codes read from the storage medium and stored in a memory of a function expansion board or unit connected to the control unit, a CPU or the like of the function board or unit controls the various processing circuits of the embodiment system or apparatus for realizing the embodiment functions.

As described so far, according to the first embodiment, in the communication mode of the communication apparatus having a digital interface, the operation state of the digital interface ordinarily in the sleep mode is periodically switched to the active mode, and in the period while the mode is the active mode, a communication request of another apparatus is detected. With this control, a power consumption of a communication apparatus, particularly a communication apparatus such as a portable digital camcorder 200, can be reduced, and a communication path can be established when necessary.

Second Embodiment

In the description of the first embodiment, the digital interface has two functions of the active mode and the sleep mode (a lower power consumption than the active mode and unable to communicate with another apparatus). In a state capable of communicating with an external apparatus (i.e., in a communication mode), each communication apparatus controls to alternately exchange the operation periods of the modes. In this case, however, the active mode has a period shorter than that of the sleep mode, and the length of the operation period of each mode can be variably controlled in accordance with the type of a drive power source and the remaining capacity of the internal power source.

In the description of the second embodiment, similar to the first embodiment, the digital interface has two functions of the active mode and the sleep mode (a lower power consumption than the active mode and unable to communicate with another apparatus). In a state capable of communicating with an external apparatus, each communication apparatus controls to alternately exchange the operation periods of the modes so that the operation period of the active mode is made at least a twofold of that of the sleep mode.

FIG. 7 is a block diagram showing the structure of a communication system of the second embodiment. The digital interface of each of the plurality of communication apparatuses of the second embodiment is in conformity with IEEE 1394 standards and has functions to be described later.

Referring to FIG. 7, reference numeral 701 represents a personal computer (hereinafter called a PC) for recording, displaying, and editing image data, text data, graphics data and the like transferred from each apparatus. Reference numeral 702 represents a printer for printing image data, text data, graphics data and the like transferred from each apparatus. Reference numeral 703 represents a mount type digital VTR (hereinafter called a digital VTR), and reference numeral 704 represents a camera mounted digital video recorder (hereinafter called a digital camcorder). The communication apparatus constituting the communication system of the second embodiment is not limited only to the apparatuses shown in FIG. 7, but other digital apparatuses such as digital camera, scanners, hard disk drives, and CD-ROM drives may be used if they can perform communication in conformity with IEEE 1394 standards and have the functions to be described later.

The digital interface of each apparatus shown in FIG. 7 has one or more communication ports 705. Each communication port 705 is connected to a cable 706. As the communication cable 706, there are two types of communication cables, a six-pin terminal cable constituted of two pairs of twist pair cables for transmission/reception of data encoded through a DS-Link scheme and a power feed pair cable and a four-pin terminal cable without the power feed cable. One pair of the two pairs of twist pair cables is used for data transfer, and the other pair is used for strobe signal transfer.

In the second embodiment, the cable 706 for the connection between PC 701 and the printer 702 and between PC 701 and the digital VTR 703 is the six-pin terminal cable having power supply pair cables, and the cable 706 for the connection between the digital VTR 703 and digital camcorder 704 is the four-pin terminal cable without the power supply pair cable.

The fundamental structure and function of the communication apparatus constituting the communication system shown in FIG. 8 will be described with reference to FIG. 8.

Figure 8:
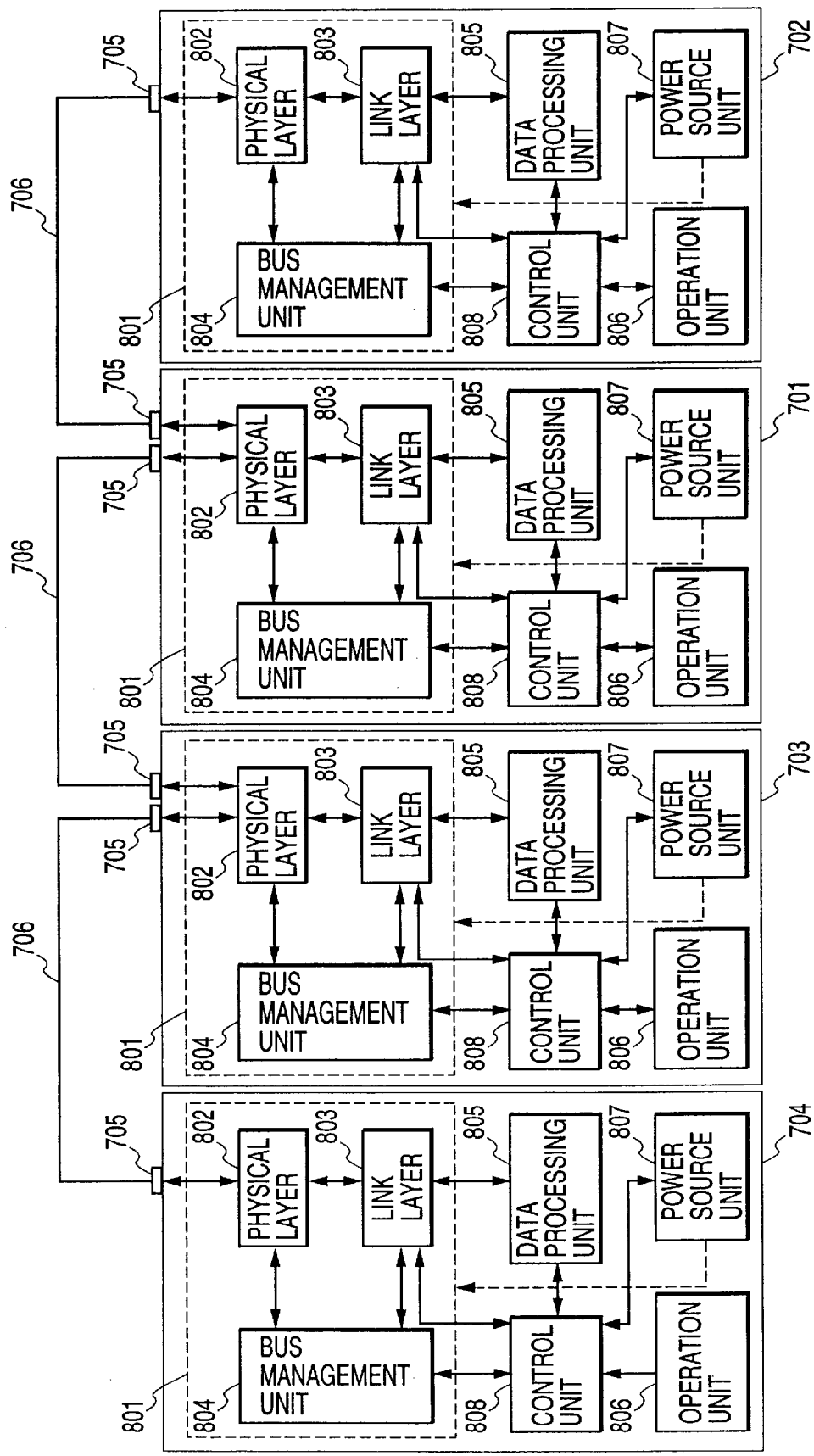
FIG. 8 is a block diagram showing the fundamental structure of each communication apparatus shown in FIG. 7.

Referring to FIG. 8, a digital interface 801 includes a physical layer 802, a link layer 802, and a bus management unit 803, similar to the first embodiment.

The digital interface 801 of each apparatus can deal with data transfer speeds of 100, 100, and 400 Mbps. The digital interface 801 providing a higher data transfer speed is structured to be capable of supporting the lower data transfer speed.

The digital interface 801 of each apparatus has a function of receiving data transmitted from another apparatus and repeating the received data to another apparatus.

The digital interface 801 of each apparatus also executes a process called a bus reset when an apparatus constituting the communication system is added or removed, a power is turned on or off, or at other timings. The bus reset executes the following processes.

First, the digital interface 801 of each apparatus automatically detects a change in the connection structure of the communication system and thereafter resets the connection structure recognized before that time. Second, the digital interface 801 of each apparatus determines a parent/child relationship between apparatuses connected to the network and recognizes the new connection structure as a hierarchical relationship. Third, the digital interface 801 of each apparatus transmits its own setting information to other apparatuses of the communication system. For example, the setting information includes a connection relationship with other apparatuses, an available data transfer speed, and power supplied or consumed. The above operations are executed by the physical layer 802 of each digital interface 801.

The physical layer 802 of each apparatus always monitors a change in a bias voltage applied to the communication port 705 and detects a change in the connection structure in accordance with a change in the bias voltage. The apparatus detected a change in the bias voltage transfers a bus reset request signal to the digital interface 801 of another apparatus. The bus reset is activated when all the apparatuses receive the bus reset request signal. The bus reset may be activated either upon detection of a change in the connection structure or upon issuing the request directly from a host to the physical layer 802.

The physical layer 802 also has the function of encode/decode of transmission/reception data through DS-Link, arbitration of bus use privilege, and the like.

The link layer 803 has the functions such as control of an asynchronous transfer mode and an isochronous transfer mode, generation/detection of a communication packet in conformity with the asynchronous and isochronous transfer modes, generation/detection of an error detection code to be added to each communication packet, and generation of a cycle start packet for controlling the communication cycle. The bus management unit 804 has the functions such as control of the physical layer 802 and link layer 803, management of a band and channel number in the isochronous mode, management of communication between an application and the link layer 803, and management of the connection structure of the communication system, data transfer speed, and power source of each apparatus.

A data processing unit 805 has a storage medium or memory and executes signal processing such as compression encoding, expansion decoding, print-out, display-out, recording, reproducing, editing, and synthesizing, relative to data to be dealt with each apparatus (for example, the data is image data, audio data, text data, or graphical data). An operation unit 806 can enter a control command for instructing each apparatus to execute a specific operation. A power source unit 807 supplies a necessary power to each processing unit including the digital interface 801.

A control unit 808 controls the operations of the digital interface 801, data processing unit 805, power source unit 807 and the like of each apparatus. The control unit 808 controls image and audio data transferred between the data processing unit 805 and digital interface in accordance with various communication protocols (e.g., AV protocol). The control unit 808 also controls the communication apparatus by detecting a control command entered from the operation unit 806 and by making the apparatus execute an operation corresponding to the detected control command. The control unit 808 also controls the power source unit 807 to regulate the power to be supplied to the digital interface 801. The control unit 808 has a memory for storing program codes and a microcomputer for controlling the operation of the apparatus in accordance with the program codes.

In the second embodiment, the digital interface 801 of each apparatus is provided with the active mode and sleep mode. The digital interface 801 of the second embodiment is always set to the sleep mode when the apparatus is not connected to another apparatus. After the apparatus is connected to another apparatus, the digital interface 801 changes its mode from the sleep mode to the active mode, and after a predetermined period, the mode is again set to the sleep mode. A connection to another apparatus is detected in accordance with a change in the bias voltage applied to the communication port 705. Each mode is alternately switched at an interval of a predetermined period, in accordance with the power supplied from the power source unit 807 to the digital interface 801. Switching between the modes is controlled by the control unit 808.

In the active mode of the second embodiment, a sufficient power is supplied to the digital interface 801 and the digital interface 801 can communicate with another apparatus at any time. In the active mode, the physical layer 802 of the digital interface 801 can output a bias voltage to the cable 706 and can detect the bias voltage applied to the communication port 705. Therefore, in the active mode, the digital interface 801 can automatically detect the connection structure of the system and can execute the bus reset described above.

In the sleep mode of the second embodiment, power is supplied only to a portion of the digital interface 801 and the digital interface 801 cannot communicate with another apparatus. In the second embodiment, even in the sleep mode, a power sufficient for driving the physical layer 802 is supplied to the physical layer 802 of the digital interface 801. Namely, in the second embodiment, even if the active mode and sleep mode are exchanged, the bias voltage output by the physical layer 802 does not change. Therefore, the physical layer 802 can supply the bias voltage to the cable 706 and can also detect the bias voltage applied to the communication port 705. Therefore, the digital interface 801 can automatically detect a change in the connection structure of the system even in the sleep mode and can execute the bus reset described above. The power consumed in the sleep mode is smaller than that consumed in the active mode. Although the digital interface 801 in the sleep mode cannot communicate with another apparatus, data transferred from another apparatus can be repeated to a different apparatus.

For example, in the communication system shown in FIG. 7, even under the conditions that the digital interfaces 801 of PC 701 and the digital camcorder 704 are in the active mode and the digital interfaces 801 of the printer 702 and digital VTR 703 are in the sleep mode, the connection between the printer 702 and digital VTR 703 of the communication system can be recognized. Therefore, even if any apparatus of the communication system changes its mode to the sleep mode, the connection structure of the communication system does not change.

Also even under the conditions that the digital interface 801 of the digital VTR 703 is in the sleep mode, the digital VTR 703 can repeat the image data transmitted from the digital camcorder 704 to PC 701. Therefore, even if any apparatus of the communication system changes its mode to the sleep mode, the transmission path of the communication system cannot be cut at an intermediate position.

Figure 9:
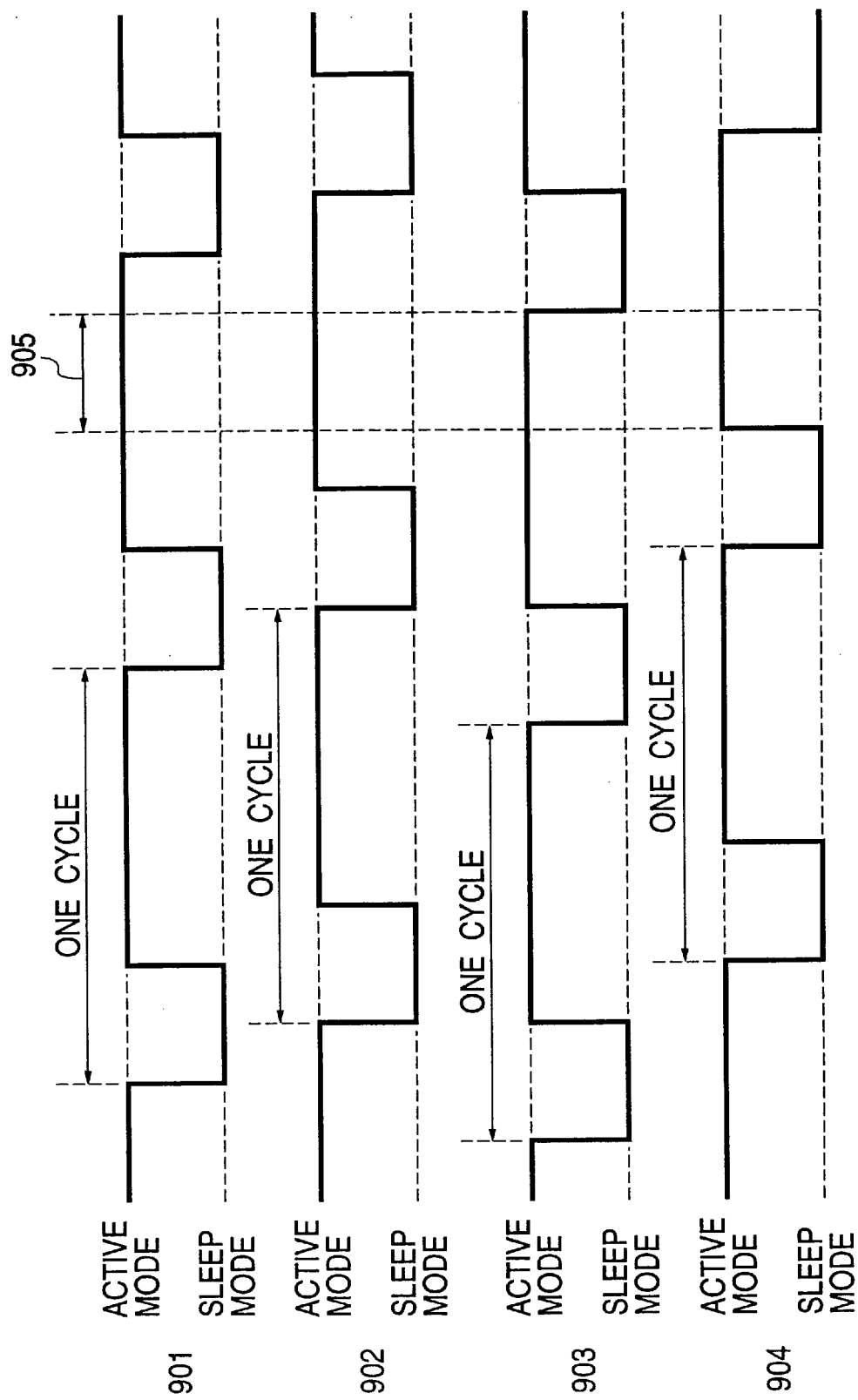
FIG. 9 is a diagram showing an example of an operation state change of each communication apparatus shown in FIG. 7.

FIG. 9 is a timing chart showing an example of a change between the active and sleep modes at each communication apparatus shown in FIG. 7. In FIG. 9, reference numeral 901 indicates an example of a timing chart of PC 701. Reference numeral 902 indicates an example of a timing chart of the printer 702. Reference numeral 903 indicates an example of a timing chart of the digital VTR 703. Reference numeral 904 indicates an example of a timing chart of the digital camcorder 704. Referring to FIG. 9, the period of the active mode is the same for all apparatuses, and the period of the sleep mode is also the same for all apparatuses. The period of the active mode and the period of the sleep mode take the same period at each cycle.

Also referring to FIG. 9, each mode is alternately exchanged at an interval of a predetermined period. The period of the active mode is longer than that of the sleep mode, and is set to at least a period longer than a twofold of that of the sleep mode. Therefore, in the communication system of the second embodiment, there is a high possibility that while the digital interface 801 of one apparatus is in the active mode, the digital interfaces of all the other apparatuses are in the active mode (i.e., in the period 905 in FIG. 9).

When one apparatus intends to communicate with another apparatus, the digital interface 801 of the apparatus inquires the state of the communication partner during the period while the mode is the active mode. If the inquiry result shows that the digital interface 801 of the partner communication apparatus is in the active mode, the communication starts. During the period while the mode is the active mode, the digital interface 801 of each apparatus can receive data transmitted to the apparatus from another apparatus. The digital interface 801 of each apparatus takes the active mode until communication is terminated or stopped intermediately after the communication starts. After the termination of the communication, each apparatus again alternately switches between the two modes to reduce the power consumption of the apparatus.

For example, if the same data is to be transferred to all apparatuses on the communication system like the communication in conformity with the isochronous transfer mode of IEEE 1294, this communication starts in the second embodiment during the period while all the apparatuses take the active mode (i.e., the period 905 in FIG. 9). If data is to be transferred to a particular apparatus like the communication in conformity with the asynchronous transfer mode, this communication starts in the second embodiment during the period while the particular apparatus takes the active mode. The digital interface 801 of each apparatus continues the active mode until the communication is terminated.

As above, if the digital interface 801 of the second embodiment is connected to the external apparatus, both efficient power consumption reduction and communication path establishment when necessary can be satisfied by alternately switching between the active and sleep modes at an interval of a predetermined period.

The digital interface 801 of the second embodiment sets the period of the active mode to a period longer than the period of the sleep mode at least by a twofold. Therefore, there is a high possibility that while a transmitting side apparatus in the active mode, one or a plurality of reception side apparatuses are in the active mode. Therefore, the communication system of the second embodiment can satisfy both the efficient power consumption reduction of the whole system and establishment of communication paths of a plurality of apparatuses.

Figure 10:
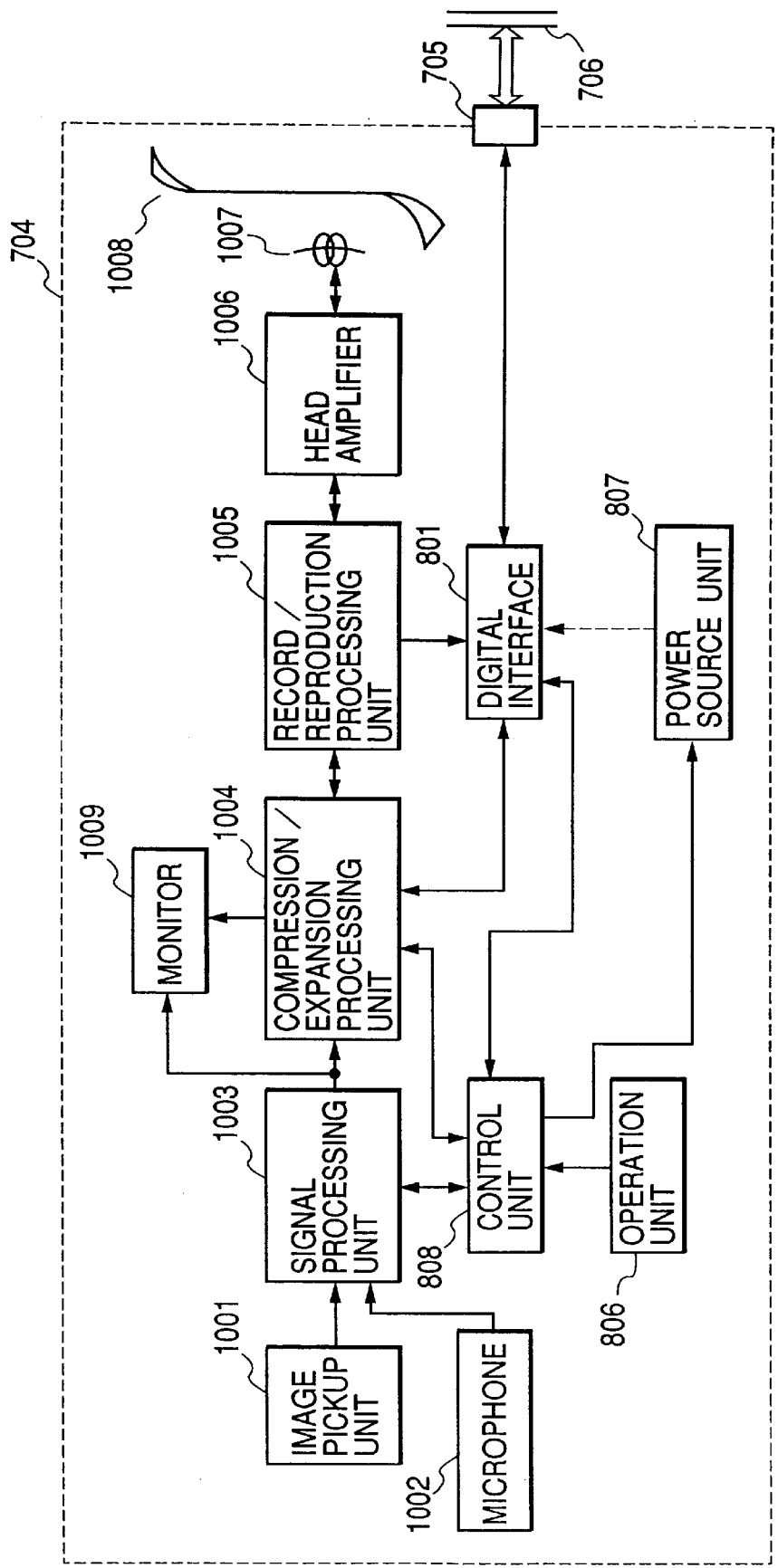
FIG. 10 is a block diagram showing the detailed structure of a digital camcorder 704 shown in FIG. 7.

FIG. 10 shows an example of a communication apparatus constituting the communication system of the second embodiment. The structure of the digital camcorder 704 of the second embodiment will be described with reference to FIG. 10. The digital camcorder 704 of the second embodiment is driven with the internal power source such as a battery. The digital camcorder 704 of the second embodiment is connected to the communication system shown in FIG. 7 via a communication cable without the power supply cable (i.e., four-pin terminal cable). It is therefore impossible to receive the power from the communication system.

Referring to FIG. 10, an image pickup unit 1001 has a plurality of optical lenses and image pickup elements such as CCD and generates an electrical signal from an optical image of a subject taken with the optical lenses and image pickup elements. A microphone 1002 collects external sounds and generates audio signals. A signal processing unit 1003 digitizes the electrical signal generated by the image pickup unit 1001 and converts it into a digital image signal of the standard television format (NTSC, PAL, or the like). The signal processing unit 1003 also digitizes the audio signal generated by the microphone 1002 and converts it into a digital audio signal of a predetermined format.

Also referring to FIG. 10, a compression/expansion processing unit 1004 performs a high efficiency compression encoding process of a predetermined scheme. (e.g., quantization after discrete cosine transform for variable length encoding) relative to the digital image and audio signals generated by the signal processing unit 1003 and performs a corresponding expansion decoding process for the compression encoded digital signal. A record/reproduction processing unit 1005 converts the digital image and audio signals compression-encoded by the compression/expansion processing unit 1004 into record signals having a format suitable for a record/reproduction process. The record signals are recorded in a recording medium 1008 such as a magnetic tape via a head amplifier 1006 and a magnetic head 1007. The record/reproduction processing unit 1005 also reproduces the digital signals recorded in the recording medium 1008 via the head amplifier 1006 and magnetic head 1007. A monitor 1009 displays the digital image signal and outputs the digital audio signal, respectively generated by the signal processing unit 1003 or reproduced by the record/reproduction processing unit 1004.

In FIG. 10, the digital interface 801 converts the digital image and audio signals supplied from the compression/expansion processing unit 1004 or record/reproduction processing unit 1005 into a packet in conformity with the isochronous transfer mode in accordance with a predetermined communication protocol (e.g., AV protocol). The digital interface 801 also converts the control signal supplied from the control unit 808 into a packet in conformity with the asynchronous transfer mode in accordance with a predetermined communication protocol (e.g., AV protocol). An operation unit 806 can enter a control command for designating each of various operations of the digital camcorder 704 (e.g., start, end, an temporary stop of image pickup, record, reproduction, external communication, dubbing, and the like) by using a touch panel, a switch, a button or the like.

The control unit 808 controls the operation of each processing unit including the digital camcorder 704, and particularly controls the power to be supplied from the power source unit 807 to the digital interface 801 to thereby control the switching between the active and sleep modes.

The operation of the digital camcorder 704 of the second embodiment will be described with reference to FIG. 10. The digital camcorder 704 of the second embodiment has two process modes, a recording mode and a reproducing mode.

In the recording mode of the second embodiment, the image signal picked up with the image pickup unit 1001 and the audio signal generated by the microphone 1002 are recorded in the magnetic tape 1008.

After the start of the recording mode, image signals picked up with the image pickup unit 1001 and audio signals generated by the microphone 1002 are input to the signal processing unit 1003. The signal processing unit 1003 digitizes the input digital image and audio signals, converts the signals into signals having a predetermined format, and supplies the signals to the compression/expansion processing unit 1004. The compression/expansion processing unit 1004 performs a compression encoding process by using discrete cosine transform or the like relative to the digital image and audio signals supplied from the signal processing unit 1003, and supplies them to the record/reproduction processing unit 1005. The record/reproduction processing unit 1005 converts the compression encoded digital image and audio signals into the record signals which are recorded in the magnetic tape 1008 via the head amplifier 1006 and magnetic head 1007.

In the recording mode, if the digital camcorder 704 is connected to an external apparatus, it is possible to record the reception signal input via the digital interface 801 in the magnetic tape 1008. For example, the digital camcorder 704 can receive the digital image signals transferred from the digital VTR 703 through the isochronous transfer mode and can record them in the magnetic tape 1008.

In the reproducing mode of the second embodiment, the digital image and audio signals recorded in the magnetic tape 1008 are reproduced and these reproduced signals are output visually and auditorily by using the monitor 1009.

After the start of the reproducing mode, the record data recorded in the magnetic tape 1008 is read with the magnetic head 1007 and input to the record/reproduction processing unit 1005 via the head amplifier 1006. The record/reproduction processing unit 1005 converts the record data read from the magnetic tape 1008 into the original compression encoded digital image and audio signals and supplies them to the compression/expansion processing unit 1004. The compression/expansion processing unit 1004 performs an expansion decoding process relative to the digital image and audio signals supplied from the record/reproduction processing unit 1005 and supplies the processed signals to the monitor 1009. The monitor 1009 converts the input digital image and audio signals into signals of a standard television format and outputs the signals on a display screen or from a speaker.

Also in the reproduction mode, if the digital camcorder 704 is connected to an external apparatus, the digital image and audio signals reproduced from the magnetic tape 1008 can be output externally via the digital interface 801.

In this case, in accordance with a predetermined communication protocol (e.g. AV protocol), the record/reproduction processing unit 1005 sequentially supplies the compressed image of a predetermined data amount reproduced from the magnetic tape 1008 to the digital interface 801. The digital interface 801 packetizes the compressed image sequentially supplied from the record/reproduction processing unit 1005 into a packet in conformity with the isochronous transfer mode. Each generated packet is sequentially output via the cable 706 in each predetermined communication cycle.

Switching between the recording mode and reproducing mode is set from the operation unit 806 and controlled by the control unit 808. Each processing mode may be switched by a control signal supplied from an external apparatus. In this case, the control signal is transferred in the asynchronous transfer mode.

FIG. 11 is a flow chart illustrating the operation of the digital interface 801 of the digital camcorder 704. With referent to FIG. 11, communication, for example, between the digital VTR 703 and digital camcorder 704, will be described.

FIG. 12 is a timing chart illustrating a change in the active and sleep modes of the digital interfaces 801 of the digital VTR 703 and digital camcorder 704. In FIG. 12, reference numeral 1201 indicates the timing chart of the digital VTR 703, and reference numeral 1202 indicates the timing chart of the digital camcorder 704.

The operation of the digital interface of the digital camcorder 704 will be described with reference to FIGS. 11 and 12.

Referring to FIG. 11, the control unit 808 checks the bias voltage applied to the digital interface 801 to thereby detect a connection to an external apparatus (Step S1101). If a connection to an external apparatus is not detected, the control unit 808 controls the power supplied from the power source 807 to the digital interface 801 to make the digital interface 801 take the sleep mode (Step S1102). For example, in FIG. 12 the period 604 takes the sleep mode until the digital camcorder 704 is connected to the digital VTR 703 at the timing 1203.

If a detection to an external apparatus is detected at Step S1101, the control unit 808 controls the power supplied from the power source 807 to the digital interface 801 to make the digital interface 801 take the active mode (Step S1103).

During the period while the mode is the active mode, the control unit 808 detects whether or not there is a request for communication with an external apparatus (Step S1104). If there is a communication request, the control unit 808 checks whether or not the interface of one or a plurality of communication partners is in the active mode. If the digital camcorder and one or a plurality of communication partners take the active mode, the communication starts (Step S1105).

For example, in FIG. 12 when the digital camcorder 704 requests for a communication start at a timing 1205, the digital VTR 703 is in the sleep mode. In this case, the digital camcorder 704 waits for communication until the sleeve mode of the digital VTR 703 is switched to the active mode, and thereafter the communication starts. After the communication starts, each apparatus continues the active mode until the communication is terminated. After the communication is terminated, the mode is switched to the sleeve mode. If a predetermined period of the active mode after the communication is terminated is not lapsed, the active mode continues until this period lapses.

If it is not necessary to communicate with an external apparatus at Step S1104, the active mode continues for a predetermined period. After a lapse of the predetermined period, the control unit 808 makes the digital interface 801 change to the sleep mode (Step S1106).

After the mode is switched to the sleep mode, the control unit 808 continues the sleep mode for a predetermined period (Step S1108). After the lapse of the predetermined period, the control unit 808 makes the digital interface 801 again change to the active mode (Step S1109).

The control unit 808 checks the bias voltage applied to the digital interface 801 to thereby detect a connection to an external apparatus (Step S1110). If a connection to an external apparatus is not detected, the control unit 808 again executes Step S1104 and following Steps. If an external apparatus is disconnected, the control unit 808 makes the digital interface 801 takes the sleep mode and again monitors a connection to an external apparatus.

As above, in the communication apparatus of the second embodiment, the active mode for a normal operation and the sleep mode for power consumption reduction are alternately switched at an interval of a predetermined period. Therefore, both efficient power consumption reduction and communication path establishment when necessary can be satisfied.

Considerable advantages can be obtained particularly for a battery driven portable apparatus such as the digital camcorder 704. Considerable advantages can also be obtained for a communication apparatus which cannot be supplied with a power from the communication system via the cable 706.

In the communication system of the second embodiment, the period of the active mode in one cycle is set to a period longer than the period of the sleep mode at least by a twofold. Therefore, there is a high possibility that while a transmitting side apparatus is in the active mode, one or a plurality of reception side apparatuses are in the active mode. Therefore, the communication system of the second embodiment can satisfy both the efficient power consumption reduction of the whole system and establishment of communication paths of a plurality of apparatuses. This embodiment is particularly effective for broadcast communication like the isochronous transfer mode.

In the second embodiment, although the period of the active mode and the period of the sleep mode both having the same periods in each cycle are repetitively switched, the embodiment is not limited only thereto. For example, a probability of again starting communication immediately after an apparatus terminates communication is high. This probability lowers with time. As shown in the timing chart of FIG. 13, the period of the active mode may be made shorter and the period of the sleep mode may be made longer in accordance with a lapse time after communication is terminated. In this manner, a standby time for again starting communication can be shortened so that communication paths of a plurality of apparatuses can be established more efficiently.

Further, in the second embodiment, although a digital interface in conformity with IEEE 1394 standards is used as the digital interface of each communication apparatus, the embodiment is not limited only thereto. For example, other interfaces may also be used if they can automatically detect a change in the network configuration such as addition and removal of an electronic apparatus and can automatically set and recognize the ID of each electronic apparatus on the network.

The invention can be reduced in practice into various forms without departing from the spirit and principal features thereof.

For example, the embodiment may be configured by supplying the control unit (including a microcomputer) of the embodiment system or apparatus with a storage medium storing software program codes realizing the embodiment functions. In this case, the control unit of the embodiment system or apparatus reads the program codes stored in the storage medium and makes various circuits of the system or apparatus realize the embodiment functions.

For example, the program codes realizing the processes and functions illustrated in FIG. 11 is stored in a memory of the control unit 803 shown in FIG. 8. The control unit 808 itself reads the program codes and controls the operation of the communication apparatus shown in FIG. 8 so as to realize the embodiment functions.

The program code themselves read from the storage medium realize the embodiment functions, and the storage medium storing the program codes constitutes the invention.

The storage medium storing such program codes may be a floppy disk, a hard disk, an optical disk, a photomagnetic disk, a CD-ROM, a CD-R, a magnetic tape, a non-volatile memory card, and a ROM.

Obviously, the case wherein the embodiment functions are realized by controlling the operations of various processing circuits of the embodiment system or apparatus by an OS (operating system) running on the control unit or another application in accordance with the program codes read by the control unit from the storage medium, also constitutes the invention.

Furthermore, the scope of the invention also includes obviously the case wherein in accordance with the program codes read from the storage medium and stored in a memory of a function expansion board or unit connected to the control unit, a CPU or the like of the function board or unit controls the various processing circuits of the embodiment system or apparatus for realizing the embodiment functions.

Therefore, the embodiment is given only illustratively in all respects and should not be construed limitatively.

As described so far, according to the second embodiment, in the communication system constituted of communication apparatuses each provided with the active mode for normal communication and the sleep mode for stopping a power supply to a portion of the processing circuit, the modes are alternately exchanged at an interval of the predetermined period so that both the efficient power consumption reduction and communication path establishment can be satisfied.

Further, according to the second embodiment, in the communication system constituted of communication apparatuses each provided with the active mode for normal communication and the sleep mode for stopping a power supply to a portion of the processing circuit, during the period while a transmission side apparatus is in the active mode, one or a plurality of reception side apparatuses are also in the active mode. Accordingly, both the efficient power consumption reduction of the whole system and establishment of communication paths of a plurality of apparatuses, can be satisfied.

What is claimed is:

1. A communication apparatus comprising:
   a communicator, operable in either an active mode or a passive mode, wherein in the active mode said communicator automatically detects a connection to an external apparatus and communicates with the external apparatus, and in the passive mode said communicator does not automatically detect a connection to an external apparatus, and wherein said communicator consumes less power while operating in the passive mode than while operating in the active mode; and
   a controller, arranged for controlling said communicator to cause said communicator to alternately switch its operation between the active mode and the passive mode.

2. A communication apparatus according to claim 1, wherein a period of the passive mode is longer than a period of the active mode.

3. A communication apparatus according to claim 1, wherein said controller controls a period of the active mode and a period of the passive mode based on a type of a power source which drives said communication apparatus.

4. A communication apparatus according to claim 1, wherein said controller controls a period of the active mode and a period of the passive mode based on a remaining capacity of an internal power source which drives said communication apparatus.

5. A communication apparatus according to claim 1, wherein said controller controls a period of the active mode and a period of the passive mode based on a lapse of time after a communication is terminated.

6. A communication apparatus according to claim 1, wherein a period of the active mode is longer than a period of the passive mode.

7. A communication apparatus according to claim 6, wherein the period of the active mode is twice as long as the period of the passive mode.

8. A communication apparatus according to claim 1, wherein said controller continues the active mode at least until a communication is terminated.

9. A communication apparatus according to claim 1, wherein said communicator has an isochronous transfer mode.

10. A communication apparatus according to claim 1, wherein said communicator is in accordance with IEEE 1394.

11. A communication apparatus according to claim 1, wherein said communication apparatus is a portable apparatus driven with an internal power source.

12. A communication apparatus according to claim 11, wherein said communication apparatus is a digital video recorder with a camera.

13. A method for operating a communication apparatus, comprising the steps of:
   providing the communication apparatus with a communication interface that is operable in either an active mode or a passive mode, wherein in the active mode the communication interface automatically detects a connection to an external apparatus and communicates with the external apparatus, and in the passive mode the communication interface does not automatically detect a connection to an external apparatus, and wherein the communication interface consumes less power while operating in the passive mode than while operating in the active mode; and controlling the communication interface to cause the communication interface to alternately switch its operation between the active mode and the passive mode.

14. A method according to claim 13, wherein a period of the passive mode is longer than a period of the active mode.

15. A method according to claim 13, further comprising a step of controlling a period of the active mode and a period of the passive mode based on a type of a power source which drives the communication apparatus.

16. A method according to claim 13, further comprising a step of controlling a period of the active mode and a period of the passive mode based on a remaining capacity of an internal power source which drives the communication apparatus.

17. A method according to claim 13, further comprising a step of controlling a period of the active mode and a period of the passive mode based on a lapse of time after a communication is terminated.

18. A method according to claim 13, wherein a period of the active mode is longer than a period of the passive mode.

19. A method according to claim 18, wherein the period of the active mode is twice as long as the period of the passive mode.

20. A method according to claim 13, further comprising a step of controlling the communication interface to continue the active mode at least until a communication is terminated.

21. A method according to claim 13, wherein the communication interface has an isochronous transfer mode.

22. A method according to claim 13, wherein the communication interface is in accordance with IEEE 1394.

23. A method according to claim 13, wherein the communication apparatus is a portable apparatus driven with an internal power source.

24. A method according to claim 13, wherein the communication apparatus is a digital video recorder with a camera.

* * * * *